Oct. 28, 1930.  C. E. WOOD  1,779,652
APPARATUS FOR PERFORATING WELL CASINGS
Filed Dec. 10, 1929  2 Sheets-Sheet 2
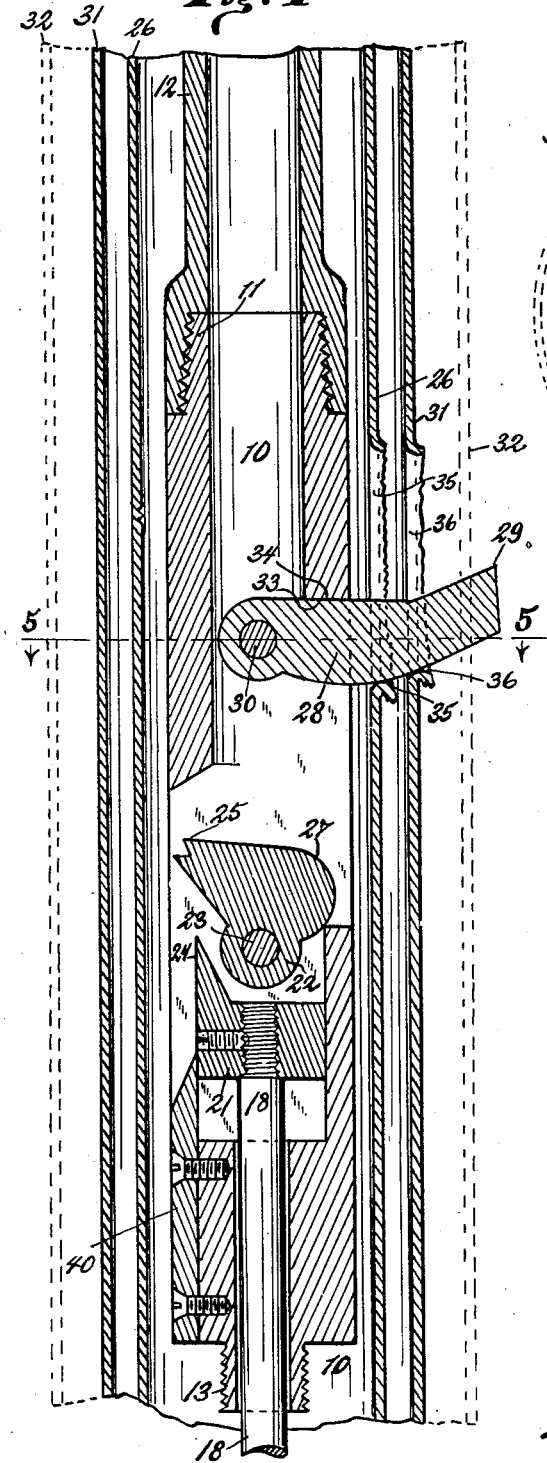
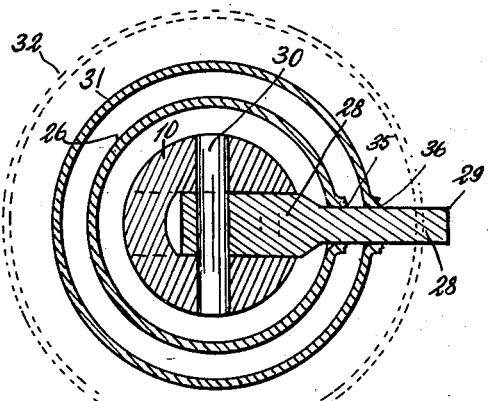
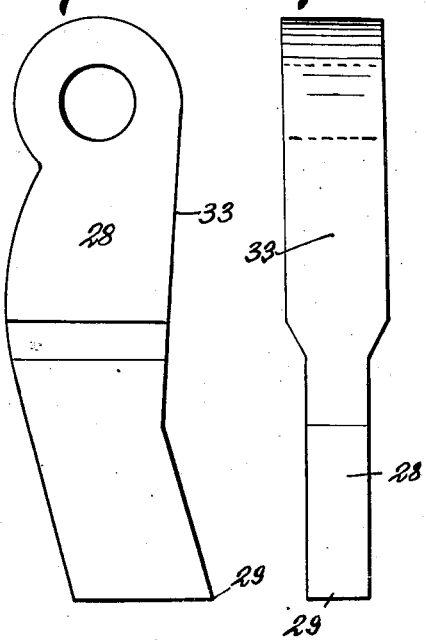
Inventor.
Charles E. Wood.
by
Lockwood & Lockwood,
His Attorneys.

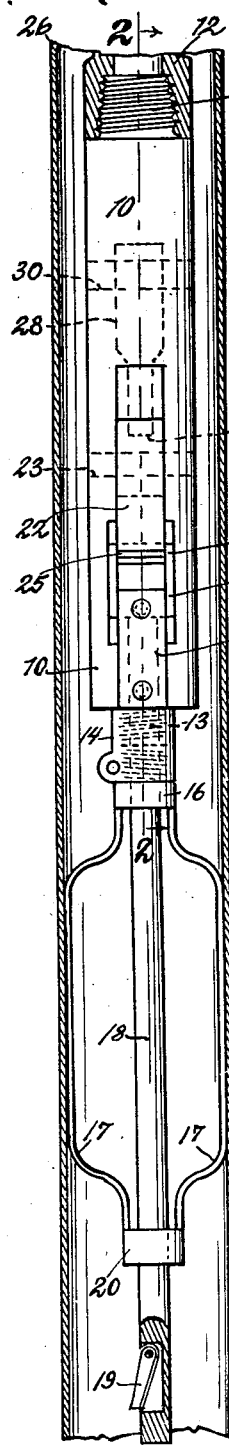

Patented Oct. 28, 1930

1,779,652

UNITED STATES PATENT OFFICE

CHARLES EDWARD WOOD, OF LOS ANGELES, CALIFORNIA

APPARATUS FOR PERFORATING WELL CASINGS

Application filed December 10, 1929. Serial No. 413,966.

This invention relates to an apparatus for perforating well casings and the principal object is to provide such an apparatus having a single knife constructed and arranged so it can be driven out through one or more well casings to form large slots through which oil or water can enter the inner casing, with means for centralizing the apparatus in the inner casing while the knife is being actuated to thereby avoid unnecessary frictional contact between the apparatus and casing while the perforating is being accomplished.

Another object of the invention is to provide a simple positive means for starting and forcing the cutting point of the knife into and through the wall of the inner casing, which movements are accomplished by means of a thrust cam acting on the free end of the knife to actuate it as stated. That is, the cam is actuated to cause the cutting point of the knife to engage with the inner wall of the inner casing and force it to break through the wall.

A feature of invention is shown in the construction and arrangement of the perforating knife in the apparatus whereby only its cutting point will first engage the inner wall of the casing when actuated, as the end portion of the knife carrying the cutting point is offset edgewise to the body of the knife, so that only the cutting point can engage the wall in the initial movement of the knife to perforate a casing.

Another feature of invention is shown in the construction, arrangement and operation of the thrust cam whereby it is operated to engage and thrust the cutting point of the knife through the casing and simultaneously engage the opposite side of the casing wall and hold the apparatus central in the casing while the knife is being driven through the wall.

Another and important new feature of the invention consists in the relative arrangement of the parts so as to centralize the thrust of the knife and cam within the inner casing. Thus the knife and cam are centrally pivoted therein and coact so that the knife turns one way and the cam the opposite way, and both simultaneously engage opposite walls of the inner tube, substantially as hereinafter explained.

Other objects, advantages and features of invention may appear from the accompanying drawings, the subjoined detailed description and the appended claims.

The accompanying drawings illustrate the invention.

Figure 1 is a perspective view of an apparatus for perforating well casings that is constructed in accordance with this invention, showing it arranged in a well casing and connected to the usual spring stop appliance, the casing, drill rod and stem of the stop apparatus being shown in section.

Fig. 2 is a central vertical section on line 2—2, Fig. 1, showing the knife and thrust cam in a normal idle position and showing the stop appliance released from the apparatus and the wedge block in position to actuate the cam; also showing an inner and outer casing.

Fig. 3 is a view analogous to Fig. 2, showing the apparatus moved down on the wedge block so that it has actuated the thrust cam to engage the casing wall at one point and force out the knife in an opposite direction so its cutting point is engaged with and thrust through the wall of the inner casing.

Fig. 4 is a view analogous to Fig. 3, showing the arrangement of the parts after the apparatus has formed slots in both the inner and outer casings, also showing by dotted lines a cementitious wall of the well through which the free end of the knife is also extended.

Fig. 5 is a cross section on line 5—5, Fig. 4.

Fig. 6 is an enlarged side view of the knife showing its cutting point offset edgewise from the body of the knife.

Fig. 7 is an edge view of the knife.

The apparatus for perforating well casings includes a tubular housing 10 having a threaded stem 11 at its upper end by which it can be detachably connected to a hollow drill rod 12 that is actuated in the usual way well known in the art.

Also the housing 10 has a threaded stem 13 at its lower end that is detachably connected to one end of a sleeve 14 that has its other end secured to a stem 15 of a spring stop 16. The stem 13 preferably has a left hand thread so that the spring stop can be disconnected from the apparatus whenever desired by rotating the drill rod to the right and can be reconnected by a reverse rotation of the rod.

The construction and operation of the spring stop 16 are old and well understood in the art and for that reason is shown semi-diagrammatically, it being understood that when detached from the apparatus the bow springs 17 will remain stationary in the well casing, and when the center rod 18 is raised so that the latch 19 is lifted above the band 20, it will be held in an elevated position, or so that when the apparatus is lowered the rod 18 will lift the wedge block 21 to actuate the thrust cam 22. The wedge block is held in the apparatus by a plate 40, screwed to housing 10.

The cam 22 is pivotally mounted on a pin 23 in the housing 10 and arranged so it can be engaged at one side of its pivot by a wedge 24 on the movable block 21, and thereby actuated so that the toothed extension 25 of the cam will be moved upwardly from the position in Fig. 2 to the position in Fig. 3 to engage the inside wall of the inner casing 26.

Simultaneously with this initial movement of the cam, its curved thrust-extension 27 will engage the rear side of the lower end of the knife 28, as shown in Fig. 2, and move its cutting point 29 outward into engagement with the inner wall of the inner casing 26 opposite, but slightly above the point engaged by the toothed extension 25 of cam 22, as shown in Fig. 3.

The knife 28 is pivotally mounted on a pin 30 in the housing 10 and is of considerable length so that it can be driven to penetrate both the inner casing 26 and outer casing 31 and also break through the cementitious lining 32 of the well indicated by dotted lines in Figs. 4 and 5.

After the cam is actuated to engage the casing and actuate the knife, its further actuation will drive the knife through the wall of the inner casing 26, without greatly swelling or injuring the casing at the point of contact of the cam because the cam is about twice the width of the cutting portion of the knife.

It is noted that the housing 10 is cylindrical and nearly as large as the inner casing 26 so as to be loosely moved downward therein, and that the cam 22 is pivoted in housing 10 beneath the pivot of the knife 28 in the housing and both are pivoted centrally of the housing 10 and inner casing 26, as shown. Since the cam and knife act against each other with a lateral thrust, as shown in Fig. 3, there is a balanced action self-contained in the inner casing 26 with the two members 22 and 28 pressing against substantially opposite walls of the casing. Hence this avoids any tendency of the parts to throw all the down thrust on the housing toward one side of the center of the inner casing or against the side wall of such casing and at one point, so as to side track the thrust or distort the inner casing.

After the knife has been forced through the casing 26 and the housing 10 and apparatus forced further downward in the well, the knife 28 will be moved in an arc so that its cutting point will be forced outwardly through the outer casing 31 and also break the cementitious wall 32 and the arc movement of the knife will be continued until its edge 33 is engaged by the shoulder 34 of the housing 10, after which the knife will move downward with the housing to cut the slots 35, 36 in the casings 26, 31, as illustrated in Fig. 4.

After the cam 22 has driven the knife through the inner casing 28, it becomes idle and returns to a normal position when the apparatus is moved upward to release the knife from the slots so it can return to a normal position.

In operation the apparatus is actuated as described, the cam moving to force the cutting point of the knife through the inner casing after which it becomes idle.

I claim as my invention:

1. Apparatus for perforating well casings, including a housing, a knife pivotally mounted therein, a thrust cam pivotally mounted in said housing for engaging the well casing at one point and forcing said knife to penetrate the casing at a point substantially opposite to the point engaged by said cam so that said housing is centralized in said casing while said knife is being actuated.

2. Apparatus for perforating well casings, including a hollow housing, a knife pivotally mounted in said housing, a thrust cam pivoted in said housing below said knife, a wedge block for actuating said cam to cause it to engage the well casing at one point and as it is actuated to engage and move said knife to cause it to penetrate the casing at a point substantially opposite to that engaged by said cam, and means for holding said wedge block stationary while said housing is forced downward in the well casing.

3. In apparatus for perforating well casings the combination of a housing, a wedge block slidably mounted therein, a stop detachably connected to said housing for holding said wedge block in a stationary position, a cam pivotally mounted in said housing above and adjacent said wedge block, a knife pivotally mounted in said housing above said cam, a toothed extension on the cam arranged to engage the well casing when said cam is actuated by movement of said housing toward said wedge block, a convex thrust extension on said cam for engaging and forcing said knife through the well casing at a point substantially opposite to that engaged by said toothed extension, so that said housing is centralized while said knife is being driven through the casing, and means for actuating said housing toward said wedge block.

In witness whereof, I have hereunto affixed my signature.

CHARLES EDWARD WOOD.